United States Patent
Satake et al.

(10) Patent No.: US 6,610,345 B2
(45) Date of Patent: Aug. 26, 2003

(54) METHOD OF MANUFACTURING NO-BRAN CEREAL

(75) Inventors: Satoru Satake, deceased, late of Tokyo (JP), by Toshiko Satake, legal representative; Nobuhiro Matsumoto, Tokyo (JP); Takeshi Munesada, Tokyo (JP); Yukihiro Kawano, Tokyo (JP); Akihiko Kato, Tokyo (JP); Kazuto Nonaka, Tokyo (JP); Katsunori Chikamune, Tokyo (JP); Yosuke Inomoto, Hiroshima (JP); Kaoru Shitadera, Hiroshima (JP)

(73) Assignee: Satake Corporation, Tokyo (JP)

( * ) Notice: Subject to any disclaimer, the term of this patent is extended or adjusted under 35 U.S.C. 154(b) by 128 days.

(21) Appl. No.: 09/812,778

(22) Filed: Mar. 15, 2001

(65) Prior Publication Data

US 2001/0033885 A1 Oct. 25, 2001

(30) Foreign Application Priority Data

| Mar. 15, 2000 | (JP) | 2000-073076 |
| Mar. 23, 2000 | (JP) | 2000-083027 |
| Mar. 24, 2000 | (JP) | 2000-085167 |
| Jun. 16, 2000 | (JP) | 2000-182350 |
| Jul. 19, 2000 | (JP) | 2000-218854 |
| Oct. 17, 2000 | (JP) | 2000-317219 |

(51) Int. Cl.$^7$ .............. A23L 1/015; A23L 1/10; A23L 1/158
(52) U.S. Cl. ................. 426/483; 426/627; 426/618
(58) Field of Search ................. 426/483, 627, 426/618

(56) References Cited

U.S. PATENT DOCUMENTS

| 4,741,913 A | * | 5/1988 | Satake |
| 5,119,721 A | * | 6/1992 | Satake et al. |
| 5,520,949 A | * | 5/1996 | Lewis et al. |
| 5,773,066 A | * | 6/1998 | Satake et al. |

FOREIGN PATENT DOCUMENTS

| JP | 61005751 | * | 1/1986 |
| JP | 07274857 | * | 10/1995 |
| JP | 09290166 | * | 11/1997 |
| JP | 11033418 | * | 2/1999 |
| JP | 11042056 | * | 2/1999 |
| JP | 11-137191 | | 5/1999 |

* cited by examiner

Primary Examiner—Anthony J. Weier
(74) Attorney, Agent, or Firm—Staas & Halsey LLP

(57) ABSTRACT

A method of and an apparatus for manufacturing no-bran cereal such as no-bran rice which require no washing before cooking. With the method and the apparatus, bran stuck on a surface of a grain of the polished cereal is easily removed without imparting any damage on the surface, and further moisture in the grain is maintained to increase taste of the cereal. Moisture is added to the polished cereal and granular material is mixed and stirred with the moistened polished cereal to polish a surface of each grain of the polished cereal and remove bran stuck on the surface of the polished cereal. Then, the polished cereal is separated from the granular material to obtain the no-bran rice.

22 Claims, 15 Drawing Sheets

FIG.16
FIG.17
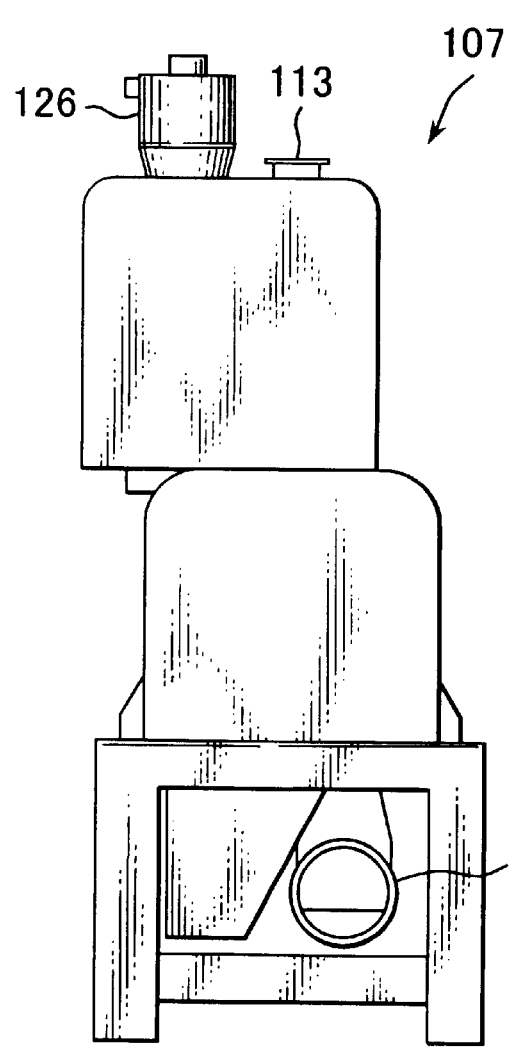
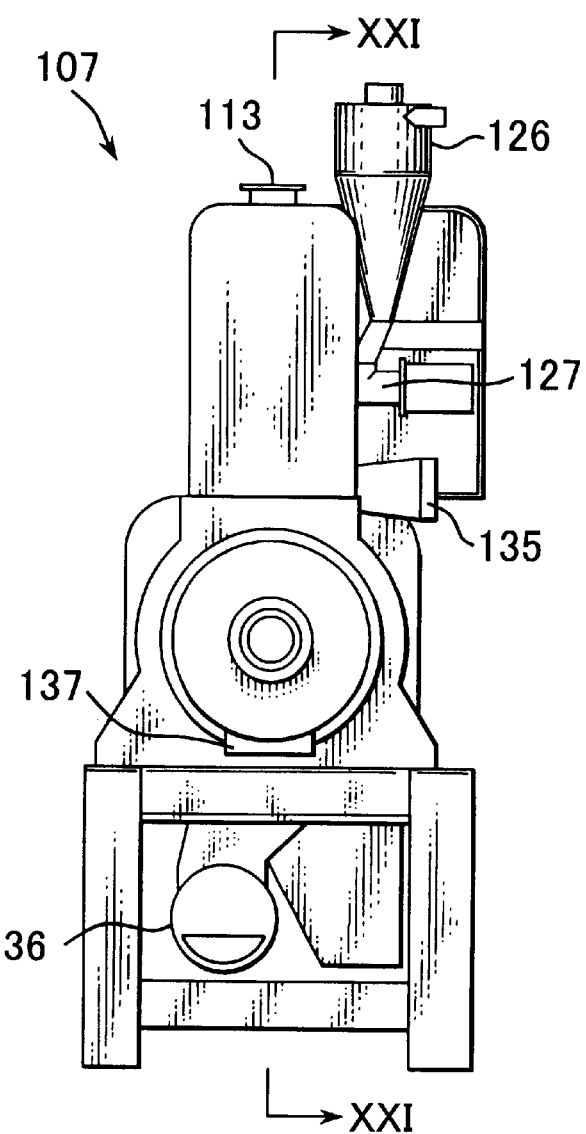

though the method using the grained rice may save water and reduce damages to the aleurone layer, it tends to break or crack grains of rice due to the lack of moisture.

METHOD OF MANUFACTURING NO-BRAN CEREAL

BACKGROUND OF THE INVENTION

1. Field of the Invention

The present invention relates to a method of and an apparatus for processing polished cereal such as polished rice to obtain no-bran cereal which require no washing before cooking, and in particular to a method and an apparatus capable of removing bran stuck on a surface of the polished cereal without imparting any damage on the surface.

2. Description of the Related Art

The no-bran rice which requires no wash before cooking is going to be brought into the market. There are known a method in which polished rice processed by a polishing machine is subjected to polishing in water for a minute time and then dehydrated to be dried, and a method in which the polished rice is polished by a grinding blush or a rubber roll, and a method adhesive material such as amyloid, sugar and saccharide is added to the polished rice and then removed. In these methods, an aleurone layer remaining in grooves or concaves on the surface of the polished rice is removed from the rice by the water-polishing, the polishing and the adhesive material, to obtain the no bran rice.

In Japanese Patent Publication No. 11-137191, there is disclosed a method in which grained rice in a range of 10 through 50 mesh is mixed to the polished rice at a rate of 100 to 10–200 by weight, and stirred to polish the polished rice and remove the bran remaining on the surface of the polished rice, and then the polished rice is separated from the grained rice. Since the bran remaining on the surface of the polished rice is removed with the above methods, washing and polishing of rice before boiling can be omitted and thus preventing nutrient from losing by washing and also preventing contamination of river by the washing water. However, a relative high pressure is required in removing the bran from the polished rice by the grained rice since the mixture of the polished rice and the grained rice is performed without adding any water to the polished rice. Therefore, a mixing machine with an agitator, an epithelium of endosperm on the surface of the rice may be cut by the high pressure and receive damages on the surface. In winter season, more high pressure is required to effectively remove the bran since the surface of the polished rice is hardened.

On the other hand, in polishing brown rice, a temperature of the brown rice is increased by friction heat before and after the polishing process and moisture of the polished rice is decreased. In manufacturing the no-bran rice by the above methods using the polished rice with low moisture, it is certain that the moisture in the processed no-bran rice is decreased to 15% or lower in weight, to lower a taste of the boiled rice.

SUMMARY OF THE INVENTION

An object of the present invention is to provide a no-bran cereal manufacturing method and an apparatus therefor capable of removing bran stuck on a surface of each grain of the cereal without imparting any damage on the surface and also improving taste of the cereal by maintaining the moisture of the cereal.

A method of manufacturing no-bran cereal of the present invention comprises the steps of: adding moisture to polished cereal; mixing and stirring granular material with the moistened polished cereal so as to remove bran stuck on a surface each grain of the polished cereal; and separating the polished cereal from the granular material.

The cereal may be rice, wheat barley corn. As the granular material, grinded rice, pre-gelatinized grinded rice, grinded wheat, grinded barleycorn, grinded millet, grinded buckwheat, grinded kaoliang and pearl tapioca can be preferably used.

The granular material may be heated before the step of mixing and stirring granular material with the moistened polished cereal. In this case, the granular material is heated to a temperature not lower than 60° C., preferably in a range between 60° C. and 80° C.

The polished cereal may be obtained by polishing hulled cereal with an conventional polishing device or by processing the hulled cereal by passing the hulled cereal through a pair of rollers coated by elastic material by a plurality of times.

The step of adding moisture to the polished cereal may include spraying the polished cereal with water and stirring the polished cereal.

After performing the step of adding moisture to the polished cereal, the steps of mixing/stirring granular material with the moistened polished cereal and separating the polished cereal from the granular material may be repeatedly performed.

After performing the step of separating the polished cereal from the granular material, the polished cereal may be subjected to wet-polishing.

The step of adding moisture to the polished cereal may be performed immediately after finishing the polishing of the hulled cereal.

In order to carrying out the above method, an apparatus for manufacturing no-bran cereal is provided according to the present invention. The apparatus may comprise: moisture adding means for adding moisture to polished cereal; mixing/stirring means for mixing and stirring granular material with the moistened polished cereal to remove bran stuck on a surface of each grain of the polished cereal; and separating means for separating the polished cereal from the granular material. The apparatus may further comprise heating means for heating the granular material before being fed to the mixing/stirring means, and may further comprise a polishing means for polishing hulled cereal to obtain the polished cereal. The polishing means may comprise a pair of rollers coated by elastic material through which the hulled cereal is passed by a plurality of times.

The moisture adding means may include a sprayer for spraying the polished cereal with water and a stirrer for stirring the polished cereal. The apparatus may further comprise an additional mixing/stirring means for mixing and stirring the polished cereal separated by said separating means and granular material; and an additional separating means for separating the polished rice from the granular material. The apparatus may further comprise a wet-polishing means for wet-polishing the polished cereal separated by said separating means.

BRIEF DESCRIPTION OF THE DRAWINGS

FIG. 16 is a right side elevation of the no-bran rice manufacturing apparatus as shown in FIG. 14;

FIG. 17 is a left side elevation of the no-bran rice manufacturing apparatus as shown in FIG. 14;

DETAILED DESCRIPTION OF THE PREFERRED EMBODIMENTS

Preferred embodiments of the method of and apparatus for manufacturing no-bran cereal according to the present invention will be described with respect to rice as an example of the cereal.

Figure 1A:
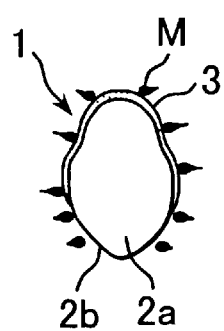
FIGS. 1a–1d are schematic views showing states of a grain surface of polished rice in respective steps of a no-bran rice manufacturing method of the present invention.

FIG. 1a shows a grain 1 of polished rice obtained by polishing brawn rice by an ordinary rice polishing machine so as to remove a pericarp, a testa, etc. and also an aleurone layer on an endosperm 2a of the brown rice. An outer surface of an endosperm 2a is covered by a commissure 2b. After the polishing of the brown rice, bran 3 is stuck on the commissure 2b. The bran 3 comprises a part of aleurone of the aleurone layer remaining on the outer surface of the commissure 2b, and the pericarp, testa, etc. and a part of the aleurone powdered after removed form the grain 1 and adhered on the commissure 2b.

A no-bran rice having no bran 3 on the surface of the grain 1 is obtained by removing the bran 3 on the commissure 2b. Easiness of removing the bran 3 from the commissure 2b depends on moisture on the surface of the grain 1. Particularly, the bran 3 is easily separated from the surface of the grain 1 when the bran 3 contains much moisture and thus is softened, and is difficult to be separated when the bran 3 contains less moisture since the surface of the rice is hardened.

Figure 1B:
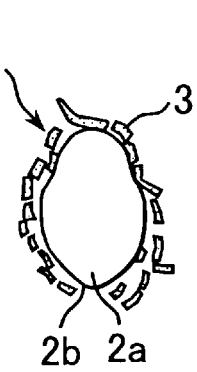

Thus, moisture in the form of mist M is added to the surface of the grain 1 of the polished rice to increase moisture in the bran 3 stuck on the commissure 2b. The bran 3 is swelled with moisture and softened. By stirring the moistened rice, a gap is formed between some bran 3 and the commissure 2b and a part of the bran 3 is separated form the commissure 2b, as shown in FIG. 1b.

Figure 1C:
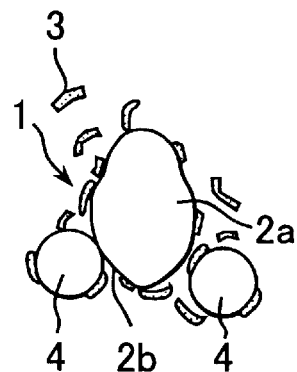
Figure 1D:
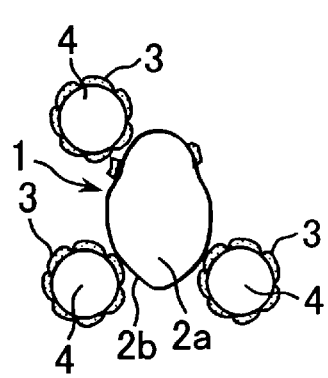

The granular material 4 having temperature not less than 70° C., preferably in a range between 70° C. and 200° C. is mixed to the moistened rice. In the case of grinded rice as the granular material, it is preferable that the grinded rice has a temperature not less than 60° C., more preferably in a range between 60° C. and 80° C. The bran 3 on the grain 1 is gelatinized by heat from the granular material 4 at a temperature higher than gelatinizing temperature when touched with granular material 4. The granular material 4 easily catches the gelatinized bran 3 and removes the bran 3 form the surface of the grain 1, as shown in FIG. 1c. Also, the surface of the grain 1 is polished by friction between the grain 1 and the granular material 4 as being stirred.

The granular material 4 has high moisture-retaining, high moisture-absorbing and high adhesive characteristics. Metal balls or ceramic grains with their surfaces coated by starch to enhance the moisture-absorbing and adhesive characteristics can be adopted as the granular material 4. Edible material such as grinded rice or grinded wheat or barleycorn and further granular material obtained by grinding cereal such as millet, buckwheat and kaoliang to have high moisture-retaining, high moisture-absorbing and high adhesive characteristics can be adopted as the granular material 4. Also, granular material such as pearl tapioca obtained by processing starch to be pre-gelatinized and being dried and formed into balls having a hardness of 2–5 kgf/cm$^2$ is preferably used.

In the case where the grinded rice is used as the granular material 4, the grinded rice separated by a separator such as a shifter for separating the grinded grain or by a color separator for separating colored grain, or starch or flour extracted from broken grain in the polishing process are suitably used as the grinded rice. It is preferable to adjust grading of granularity in a range from 1.0 mm to 1.5 mm and to dry the rice under the moisture of 5%. It is further preferable to heat the granular material by hot air of 60° C.–90° C. to be pre-gelatinized.

Figure 2:
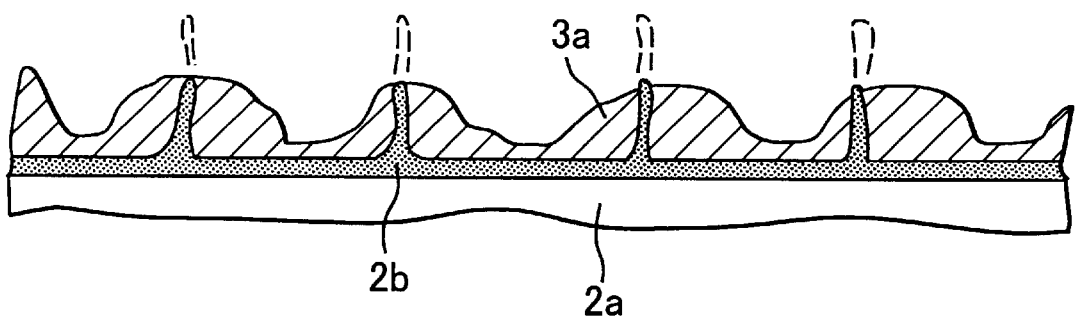
FIG. 2 is an enlarged schematic sectional view of the grain surface of the polished rice polished by an ordinary polishing machine, viewed through a microscope.
Figure 3:
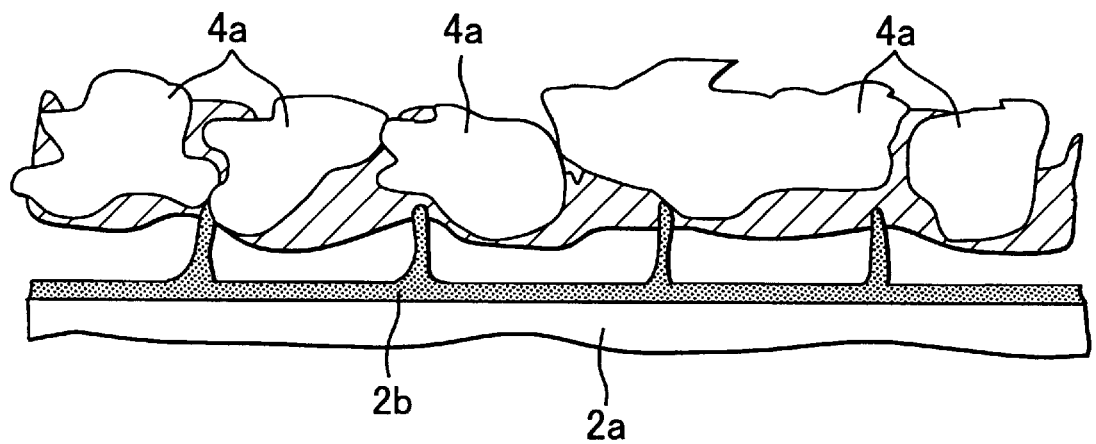
FIG. 3 is an enlarged schematic sectional view of the grain surface of the polished rice when an aleurone on the grain is caught by grained rice, viewed through a microscope.
Figure 4:
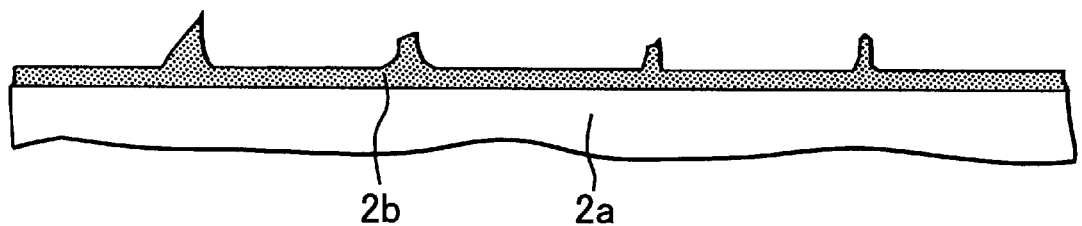
FIG. 4 is an enlarged schematic sectional view of the grain surface of no-bran rice with the aleurone removed from the surface of the grain, viewed through a microscope.

FIGS. 2–4 are enlarged views of the surface of the grain 1 showing that the aleurone remaining on the commissure 2b is removed by grinded rice.

As shown in FIG. 2, a part 3a of the aleurone remains stuck on the commissure 2b of each grain after being subjected to the polishing process. A no-bran rice with the bran removed from the commissure of the grain is obtained by removing the bran 3 from the commissure 2b.

By adding moisture to the surface of the grain 1 of the polished rice, moisture in the aleurone 3a stuck on the commissure 2b is increased so that the aleurone 3a is swelled with moisture and softened. A part of the aleurone 3a is separated form the commissure 2b, as shown in FIG. 3.

The grinded rice 4a preferably being pre-gelatinized is mixed to the moistened rice and stirred. The grinded rice 4a adheres to the aleurone 3a on the commissure 2b to form a gap between the aleurone 3a and the commissure 2b. The aleurone 3a is removed with the grinded rice 4a form the surface of the grain by friction between the grain and the grinded rice being stirred, as shown in FIG. 4.

The polished rice is separated form the grinded rice 4a catching the aleurone 3a to obtain the no-bran rice with no bran remaining in the minute recesses or grooves of the grains.

Manufacturing process of an apparatus for manufacturing no-bran rice according to first and second embodiments of the present invention will be described referring to FIGS. 5 and 6.

Figure 5:
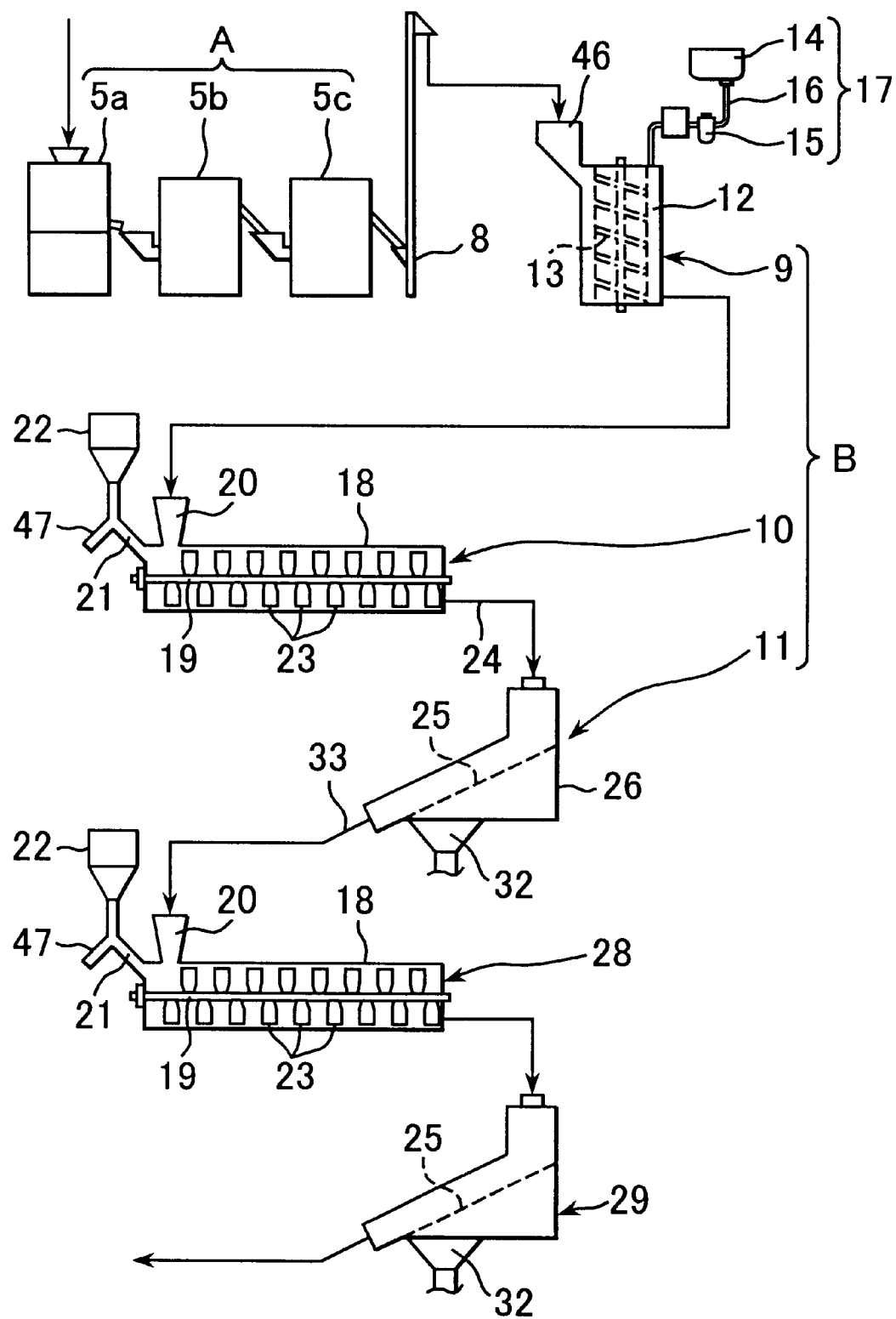
FIG. 5 is a schematic view showing respective processes of a no-bran rice manufacturing apparatus according to a first embodiment of the present invention.
Figure 6:
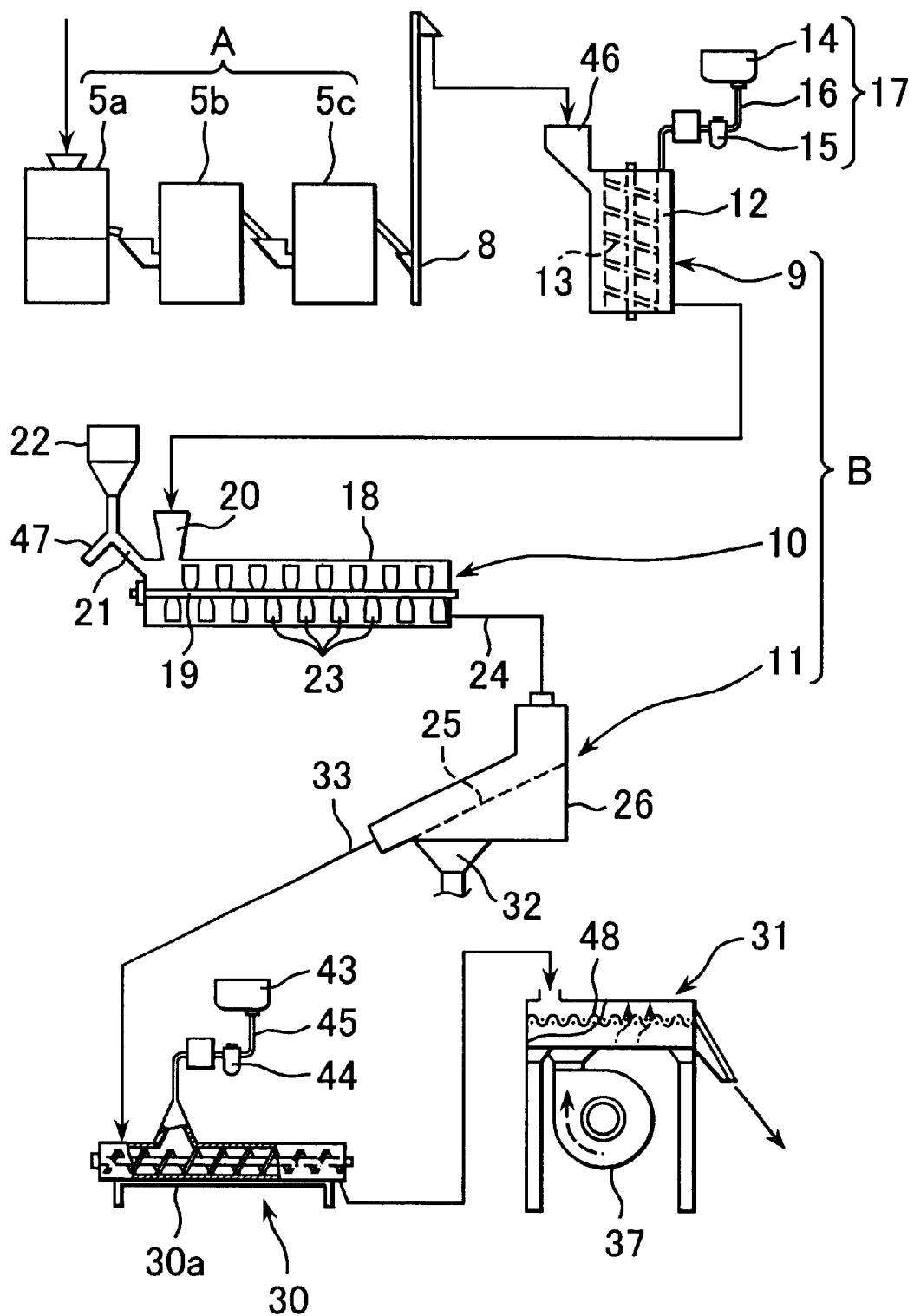
FIG. 6 is a schematic view showing respective processes of a no-bran rice manufacturing apparatus according to a second embodiment of the present invention.

The manufacturing process as shown in FIGS. 5 and 6 comprises a polishing process A having three polishing machines 5a–5c, and a bran removing process B having a moisture adding device 9, a mixing/stirring device 10 and a separating device 11.

In the polishing process A, there are provided three polishing machines of a first upright-type polishing machine 5a, a second upright-type polishing machine 5b and a third upright-type polishing machine 5c. Material brawn rice is put into the first polishing machine 5a and the polished rice is subsequently fed into the second polishing machine 5b and the third polishing machine 5c to obtain polished rice with yield of approximately 90%. A grain lifter 8 is connected to the third polishing machine 5c to conveying the polished rice to the subsequent no-bran rice producing process B. In the no-bran rice producing process B, moisture is added to the polished rice obtained by the hulling process A by a moisture adder 9 and the granular material is mixed to the moist polished rice and stirred by a mixing/stirring machine 10 to polish the polished rice, and then the mixture of the polished rice and the granular material is separated by a separator 11.

The moisture adding device 9 comprises a polished rice guiding cylinder 12 and a rotary screw 13 inserted into the cylinder 12 and moisture adder 17 having a water tank 14, an electromagnetic valve 15 and a water pipe 16 is connected to the polished rice guiding cylinder 12 at an appropriate position. The polished rice is introduced into the cylinder 12 through a hopper 46 and the rotary screw 13 is rotated in the cylinder 12 to rolling the polished rice so that moisture is added to the polished rice in rolling. It is preferable to add water of 3 to 5% of rice in weight.

The mixing/stirring device 10 comprises a horizontal cylinder 18 and a stirrer 19 rotatable in the horizontal cylinder 18, and a polished rice supplying flume 20 connected with the moisture adding machine 9 and a granular material supplying flume 21 connected with an appropriate conveyer are connected to one end portion of the horizontal cylinder 18. In the case where an air conveyer is employed as the conveyer, a cyclone 22 for separating the grained rice form air is connected to an upper portion of the granular material supplying flume 21 and a powdered rice discharge flume 47 is provided to deviate the powdered rice from granular material supplying flume 21. The stirrer 19 has a plurality of buckets 23 and is rotated by a driving source such as an electric motor. The polished rice and the granular material are stirred and mixed in the cylinder 18 and the mixture thereof is discharged form a outlet flume 24 at the other end of the cylinder 18. A hot air blower for blowing a hot air to the polished rice and the granular material in the mixing and stirring may be provided at the mixing/stirring device 10.

Figure 10:
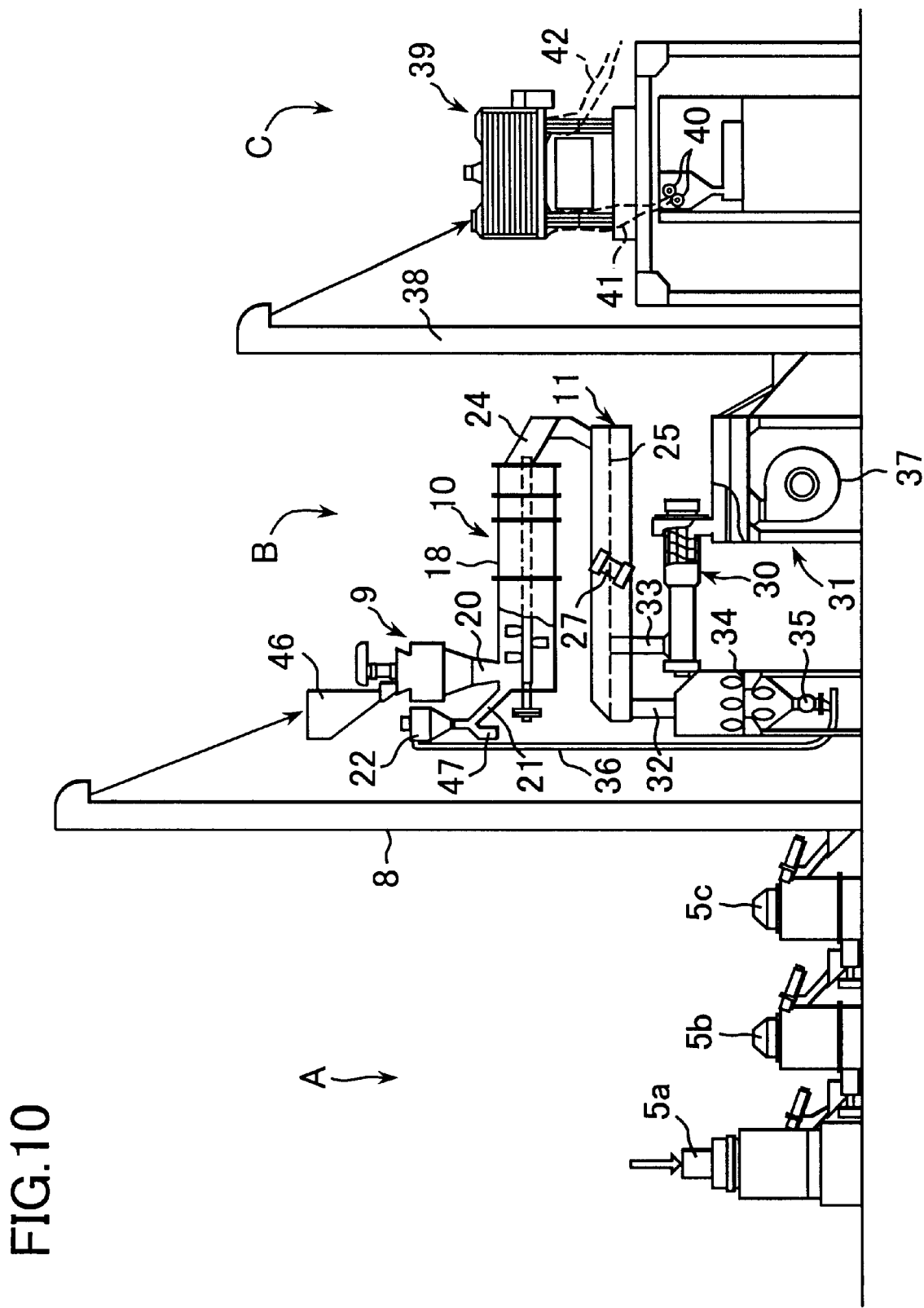
FIG. 10 is a schematic view of a no-bran rice manufacturing apparatus according to a fifth embodiment of the present invention.

The separating machine 11 may be any sifting device capable of separating the polished rice form the granular material. For example, a roughing machine 26 having a sieve 25 spread in the machine is adopted in this embodiment. Further, a vibrator 27 as shown in FIG. 10 which employs an electric motor having an output shaft connected to an eccentric flywheel for producing vibration may be provided to apply vibration to the roughing machine 26.

The no-bran rice without any bran remaining on minute grooves as shown in FIG. 4 is obtained by separating the polished rice separated by the separating device 11. Further, in order to improve whiteness of the no-bran rice and also productivity, the following arrangement is required.

Thus, in the first embodiment shown in FIG. 5, a second mixing/stirring device 28 and a second separating device 29 are provided after the separating process by the first separating device 11. With these devices, the bran remaining on the surface of the rice is fully removed and the polished no-bran rice having whiteness of 40% is obtained.

In the second embodiment shown in FIG. 6, a wet polishing device 30 for polishing the no-bran rice with moisture is provided after the separating process by the first separating device 11. The wet-type polishing device 30 adds 2%-10% moisture to the no-bran rice by weight and polishes the no-bran rice by a low-pressure friction effect, to improve the whiteness of the no-bran rice to approximately 40%. The wet-type polishing device 30 has a water tank 43, an electric valve 44 and a water pipe 45 for supplying water into a cylinder 30a. A polished rice drying device 31 is connected to the wet-type polishing device 30. The polished rice drying device 31 dries the polished no-bran rice by hot and dry air of 30° C. to 50° C. supplied from a blower 37 on a mesh 48, to a moisture of approximately 15% by weight to further improve the taste of the rice.

Figure 7:
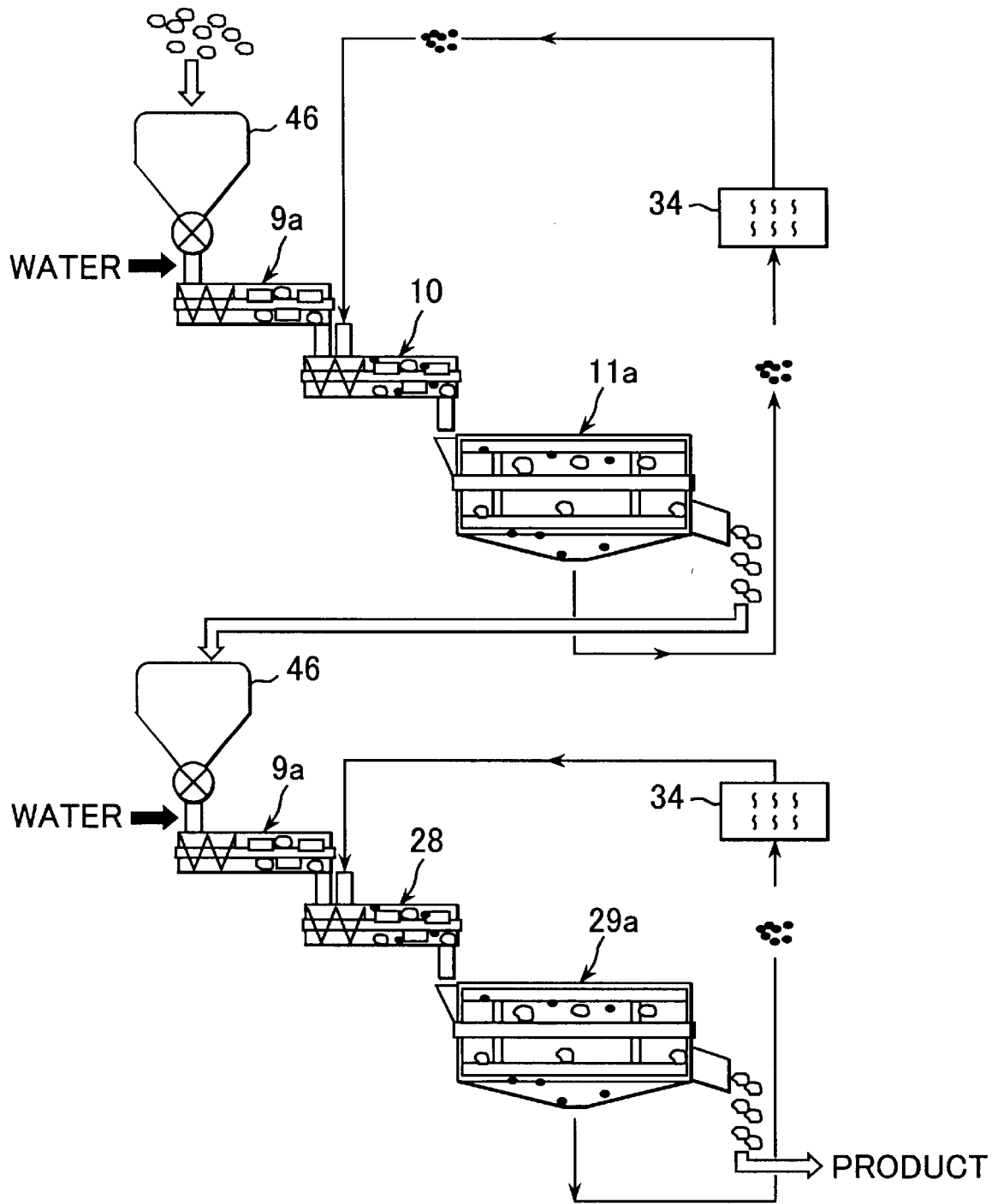
FIG. 7 is a schematic view showing a bran removing process of a no-bran rice manufacturing apparatus according to a third embodiment of the present invention.

FIG. 7 schematically shows a bran removing process of a no-bran rice manufacturing apparatus according to a third embodiment of the present invention.

In this embodiment, tow steps of the bran removing processes are provided, each comprising a horizontal moisture adding device 9a, the horizontal mixing/stirring device 10 or 28, a horizontal separating device 11a or 29a and a granular material drying device 34.

Figure 8:
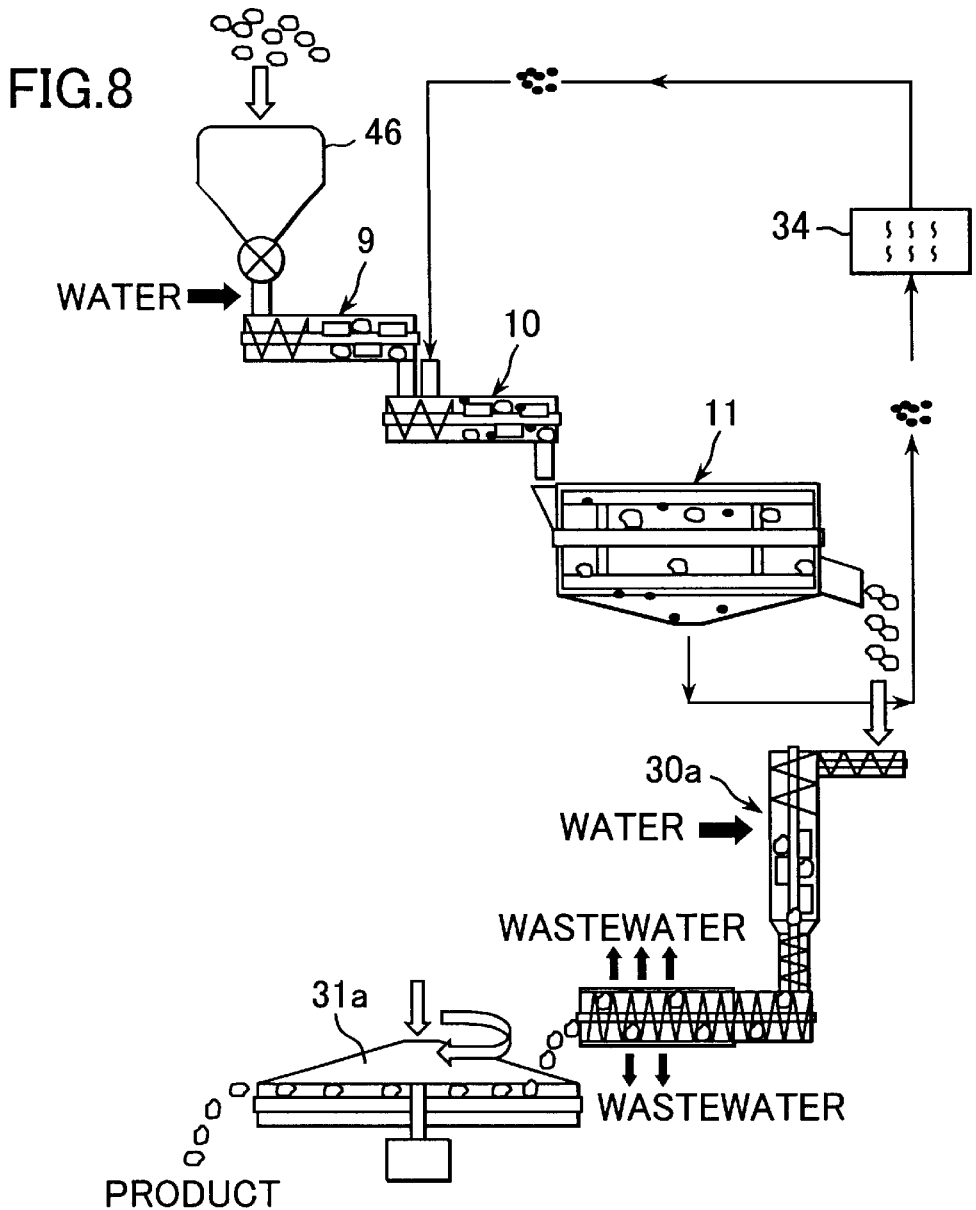
FIG. 8 is a schematic view showing a bran removing process of a no-bran rice manufacturing apparatus according to a fourth embodiment of the present invention.

FIG. 8 schematically shows a bran removing process according to a fourth embodiment of the present invention.

In this embodiment, a wet-polishing device 30a of L-shaped type is provided after a single step of the bran removing process as shown in FIG. 7. The polished rice is dried and sifted by a rotary sifter 31a after processed by the wet-polishing device 30a.

In order to improve productivity of the no-bran rice, an apparatus as shown in FIG. 10 is preferable as a fifth embodiment of the present invention.

The apparatus shown in FIG. 10 has a recycle process of the granular material. An outlet flume 32 for the granular material and a polished rice outlet flume 33 are provided at a downstream portion of the separating device 11, and a granular material drying device 34 is connected to the granular material outlet flume 33. The granular material drying device 34 drys the granular material by a hot air at temperature of 60° C.–200° C. to finish the polished rice to have moisture equal to or lower than 5% by weight and granularity of 1.0 mm–1.5 mm. When the grinded rice is adopted as the granular material, the grinded rice is heated and dried by a hot air at temperature of 60° C.–100° C. The obtained granular material is conveyed from the drying device 34 to the cyclone 22 by an air conveyer 35 and separated from the air and supplied to into the cylinder 18 of the mixing/stirring device 10 through the granular material supplying flume 21, to thus recycling the granular material.

An outlet of the polished rice drying device 31 is connected to a grading process C through a grain lifter 38. In the grading process, a rotary sifter 39 for sifting the polished no-bran rice which has regulated moister by the drying by the drying device 31 is provided. The polished rice fulfilling a predetermined reference granularity is discharged from a polished rice outlet flume 42 as finished no-bran rice, and conveyed to a subsequent measuring/packaging process not shown in the figure. The polished rice not fulfilling the predetermined reference granularity separated by the rotary sifter 39 is discharged from a granule outlet flume 41 and supplied between a pair of rolls 40 to grind into grinded rice of granularity 1.0 mm–1.5 mm. The grinded rice can be used as the granular material in the mixing/stirring process.

An operation of the apparatus shown in FIG. 10 will be described.

The brown rice as a material of the no-bran rice is thrown into the first polishing machine 5a and is successively supplied to the second and the third polishing machine 5b and 5c in the polishing process and the bran of the brown rice is almost removed from the outer surface thereof by actions of polishing rotors (not shown) to obtain polished rice with a polishing yield of 90%.

The obtained polished rice has a temperature higher than that of the material brown rice by 12° C.–15° C. and thus the moisture has been diffused to lower moisture containing ratio and is still diffusing the moisture. The polished rice in this state is immediately thrown into the moisture adding device 9 through the grain lifter 8.

Particularly, the polished rice thrown into the hopper 46 is rolled in the polished rice guiding cylinder 12 by the rotary screw 13 adding water to have moisture of 3%–5% of the grain by weight. The polished rice is supplied with moisture without causing any clack by setting the time period for passing through the guiding cylinder 12 to approximately 15 seconds, for example. The surface of the polished rice with the moisture added is slightly softened.

The polished rice having increased moisture is immediately thrown into the mixing/stirring device 10. The polished rice is stirred and mixed with granular material heated to have a temperature of 60° C.–80° C. and moisture of 5% by weight by the granular material drying device 34 in the mixing/stirring device 10, and the bran stuck on the surface of the polished rice which has been expanded due to the increased moisture is caught by the granular material to be lifted up from the commissure. Also, a surface each grain of the polished rice is further polished by a friction between the polished rice and the granular material, and the bran is removed from each grain of the polished rice. It is preferable that the mixing ratio of the polished rice to the granular material is set as 100 to 5–30 in weight.

Subsequently, the polished rice mixed with the granular material is fed to the separating device 11 to separate the polished rice from the granular material to obtain the no-bran rice with the bran removed.

In addition, the no-bran rice is fed to the wet polishing device 30. Moisture of 2%–10% in weight is added to the polished rice and the surface of thereof is further polished by friction effect under relatively low pressure of 1.0×104 Pa (100 gf/cm$^2$) to finish the surface of the polished rice. Thus, the aleurone is completely removed from the surface of the polished rice to obtained bright no-bran rice having whiteness of approximately 40%. Subsequently, the no-bran rice is fed to the drying device 31 to adjust the moisture to approximate 15% by weight for better taste. An wastewater discharged from the wet polishing device 30 is dried by a spray dryer as shown in FIG. 9 to be powdered and collected so as not to contaminate the ambiance.

Figure 9:
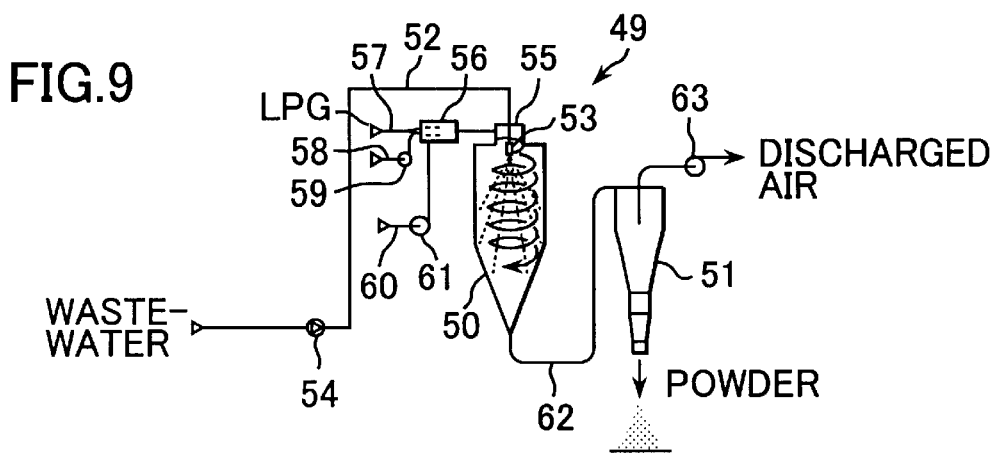
FIG. 9 is a schematic view of a spray dryer device to be connected to a wet processing device as shown in FIG. 8.

The spray dryer 49 shown in FIG. 9 comprises a spray dryer chamber 50 and a cyclone 51. A conducting pipe 52 is connected to the spray dryer chamber 50 so as to supply the wastewater from the wet polishing device 30 from a spray nozzle 53 at an end of the conducting pipe 52 at an upper portion of the chamber 50. A spray nozzle 53 is provided at an end of the conducting pipe 52 and a high pressure pump 53 is provided on a path of the conducting pipe 52 so as to spray the wastewater in the chamber 50. The spray dryer chamber 50 has a hot air chamber 55 to which a hot air is supplied from a burner 56. The burner comprises a LPG (liquefied petroleum gas) suppling pipe 57, an air inlet pipe 58, a burning blower 59, a blowing fan 61 with an air pipe 60 and is capable of adjusting temperature and flow rata of hot air supplied to the hot air chamber 55. The spray dryer chamber 50 is connected with the cyclone 51 having an evacuation fan 63 through a discharge duct 62 and powdered waste matter is separated by air flow separation of the cyclone 51 and discharged outside. An appropriate liquid condensing device may be provided before the spray dryer 49 for effective powdering of the waste matter by reducing consumption of LPG.

The granular material separated by the separating device 11 is fed to the granular material drying device 34 to be recycled. In particular, hot air of 90° C.–100° C. is fed to the granular material in the granular material drying device 34 to dry the granular material to have moisture of 5% in weight and the dried granular material is fed again to the mixing/stirring device 10. Grinded rice as the granular material can be recycled by at least five times and whiteness of the finished rice is improved by the wet polishing process, as confirmed by the following example.

EXAMPLE

Material Polished rice: produced in Hiroshima prefecture of Japan in 1999, whiteness of 41.4%, yield of 90.5%

Granular material: grinded rice having granularity not less than 1 mm, moisture of 2.4%–4.9%, ratio of mixture 20%

TABLE 1

| time(s) of recycling of grinded rice | whiteness of material polished rice | whiteness without wet polishing | whiteness with wet polishing |
|---|---|---|---|
| 1 time | 41.4% | 46.9% | 42.2% |
| 3 times |  | 46.3% | 47.9% |
| 5 times |  | 46.6% | 47.6% |

Further, the finished no-bran rice is transferred to the rotary sifter 39. The no-bran rice fulfilling a predetermined reference granularity is discharged from a no-bran rice outlet flume 42 as finished no--bran rice, and the polished rice not fulfilling the predetermined reference granularity separated by the rotary sifter 39 is discharged from a granule outlet flume 41 and supplied between a pair of rolls 40 to grind into grinded rice of granularity 1.0 mm–1.5 mm. The grinded rice can be used as the granular material in the bran removing process.

Figure 11:
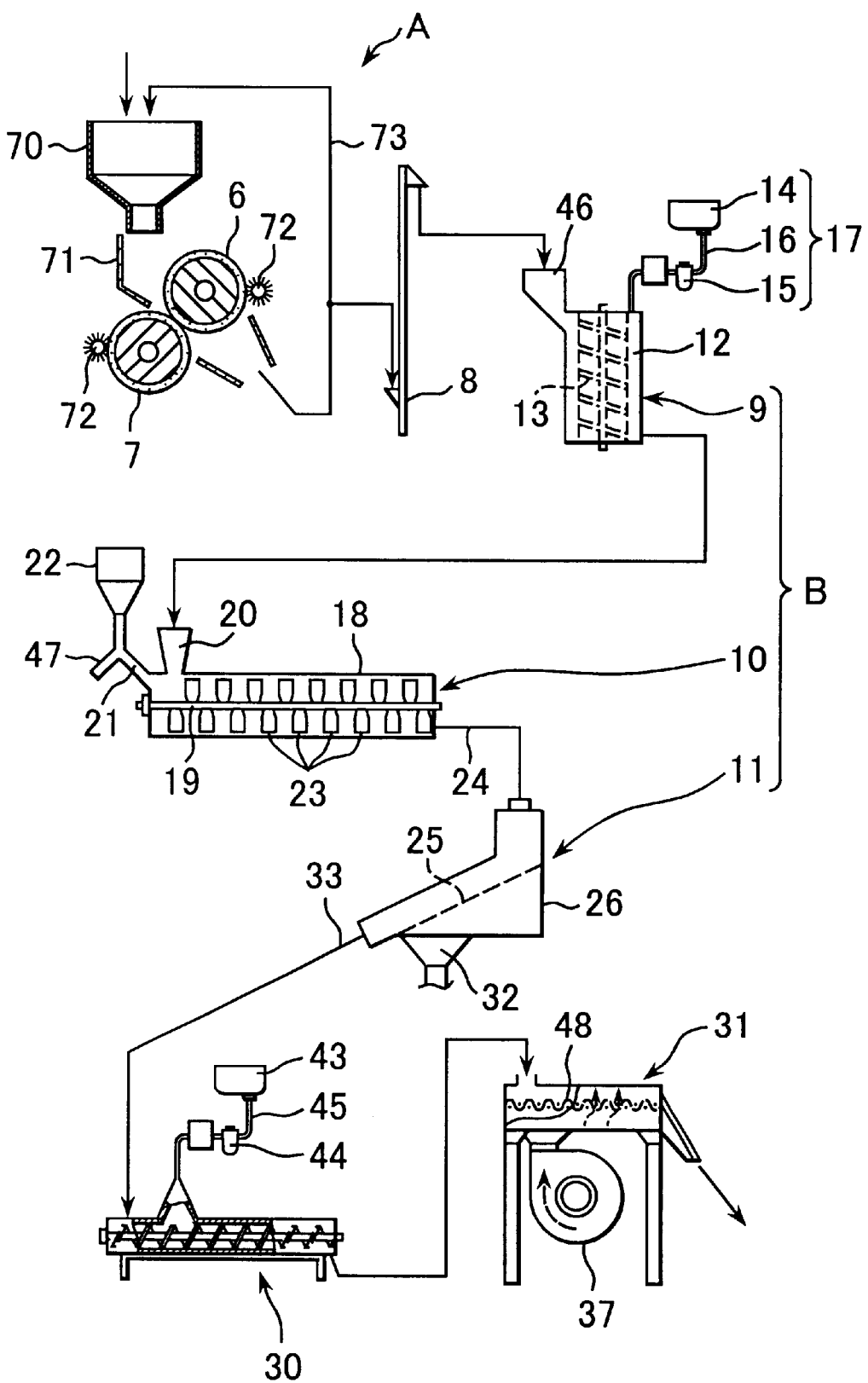
FIG. 11 is a schematic view showing respective processes of a no-bran rice manufacturing apparatus according to a sixth embodiment of the present invention.

FIG. 11 shows a sixth embodiment of the present invention.

In this embodiment, the conventional polishing devices 5a–5c in the polishing process A in the second embodiment shown in FIG. 6 are replaced by a polishing device using a pair of rollers.

The brown rice thrown into a hopper 70 is guided by a guiding flume 71 to be directed between a pair of rollers 6 and 7 which are made of relatively hard elastic material such as synthetic resin, foam, sponge and rubber having hardness of approximately 90°. A gap between the rollers 6 and 7 is preferably set to 0.5 mm. The brown rice is polished by pressure from the rollers 6 and 7 and friction caused by a difference of circumferential velocities of the two rollers 6 and 7. The pericarp, testa and part of aleurone layer on each grain of the brown rice are peeled to be removed from a surface of each grain without damage on the surface, contrary to the conventional polishing machine which causes scrapes on the surface. The brown rice is polished to be polished rice at yield of approximately 92%. Blushes 72 are arranged for cleaning surfaces of the rollers 6 and 7, and a returning path 73 is provided for returning the polished rice to the hopper 70 for passing the brown rice between the rollers 6 and 7 by a plurality of times. The returning path 73 is connected to a grain lifter 8 to be supplied to the subsequent bran removing process B.

Figure 12:
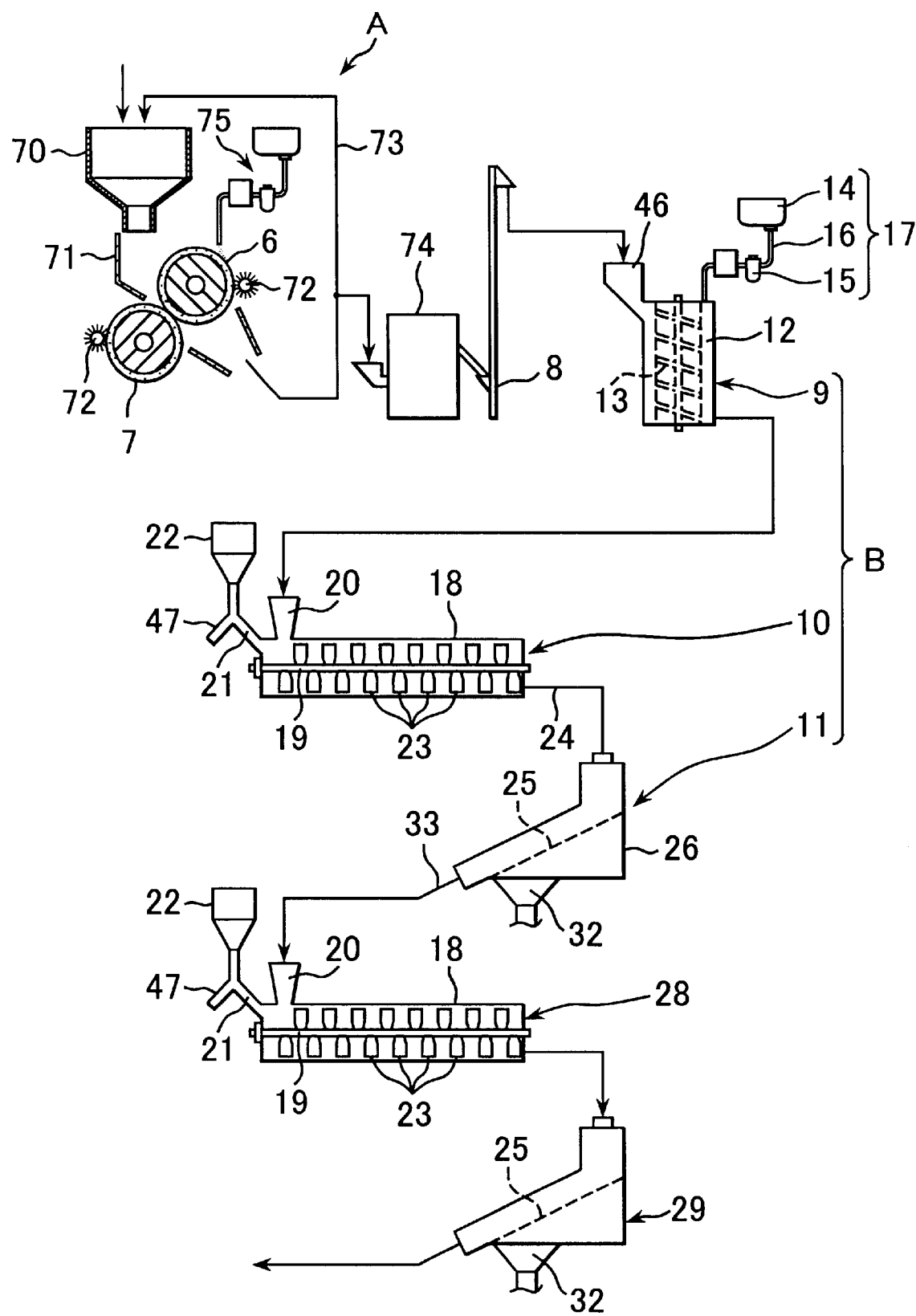
FIG. 12 is a schematic view showing respective processes of a no-bran rice manufacturing apparatus according to a seventh embodiment of the present invention.

FIG. 12 shows a seventh embodiment of the present invention.

In this embodiment, the conventional polishing devices 5a–5c in the polishing process A in the first embodiment shown in FIG. 5 are replaced by the polisher as shown in FIG. 11. Further, a conventional friction polisher 74 is provided after the polisher using a pair of rollers 6 and 7 so that polished rice at polishing yield of 92% is obtained in a short time. The polishing device of this embodiment has a moisture adding device 75 to improve yield of polishing and enhance efficiency of polishing by the rollers 6 and 7.

Figure 13:
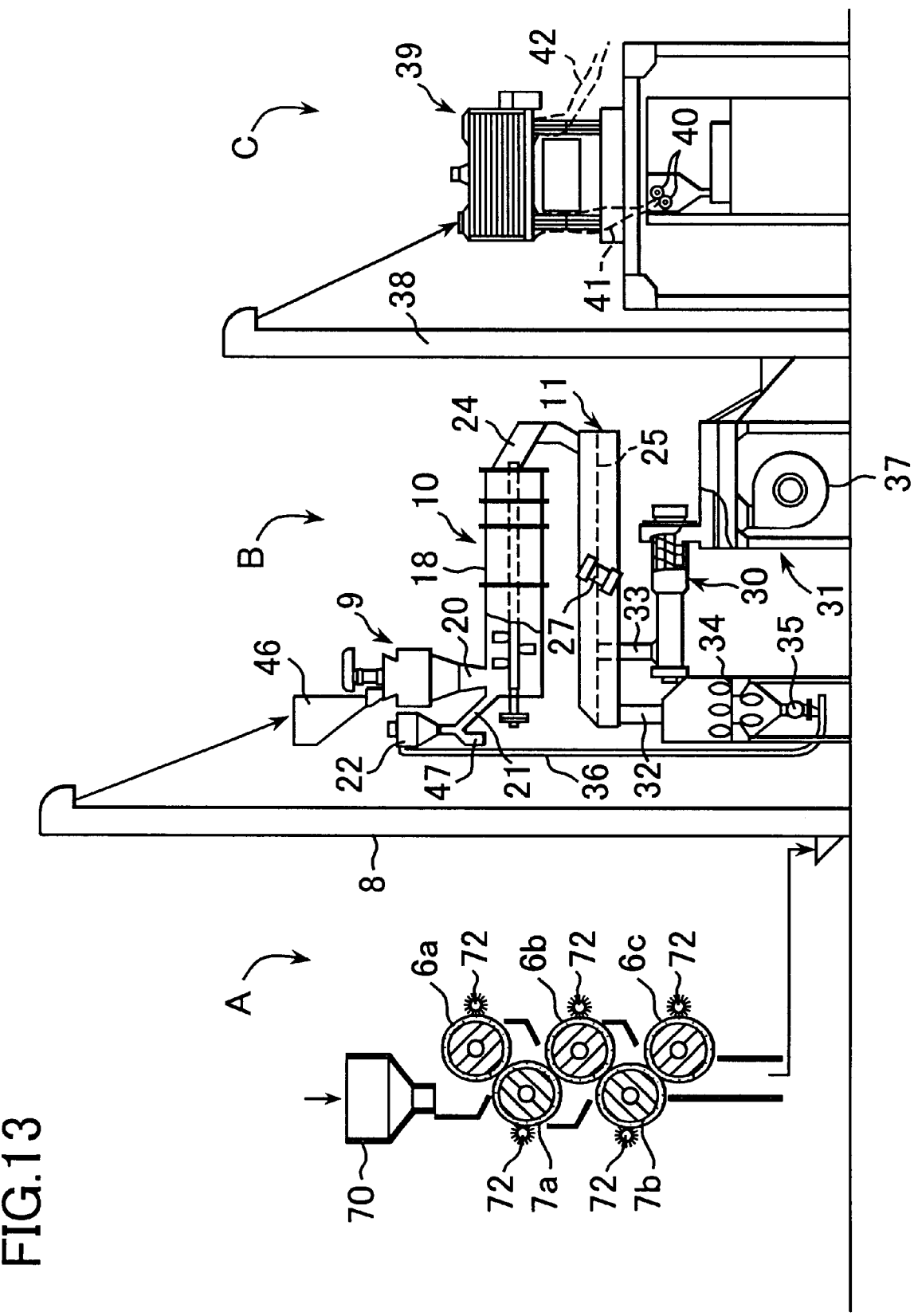
FIG. 13 is a schematic view of a no-bran rice manufacturing apparatus according to a eighth embodiment of the present invention.
Figure 14:
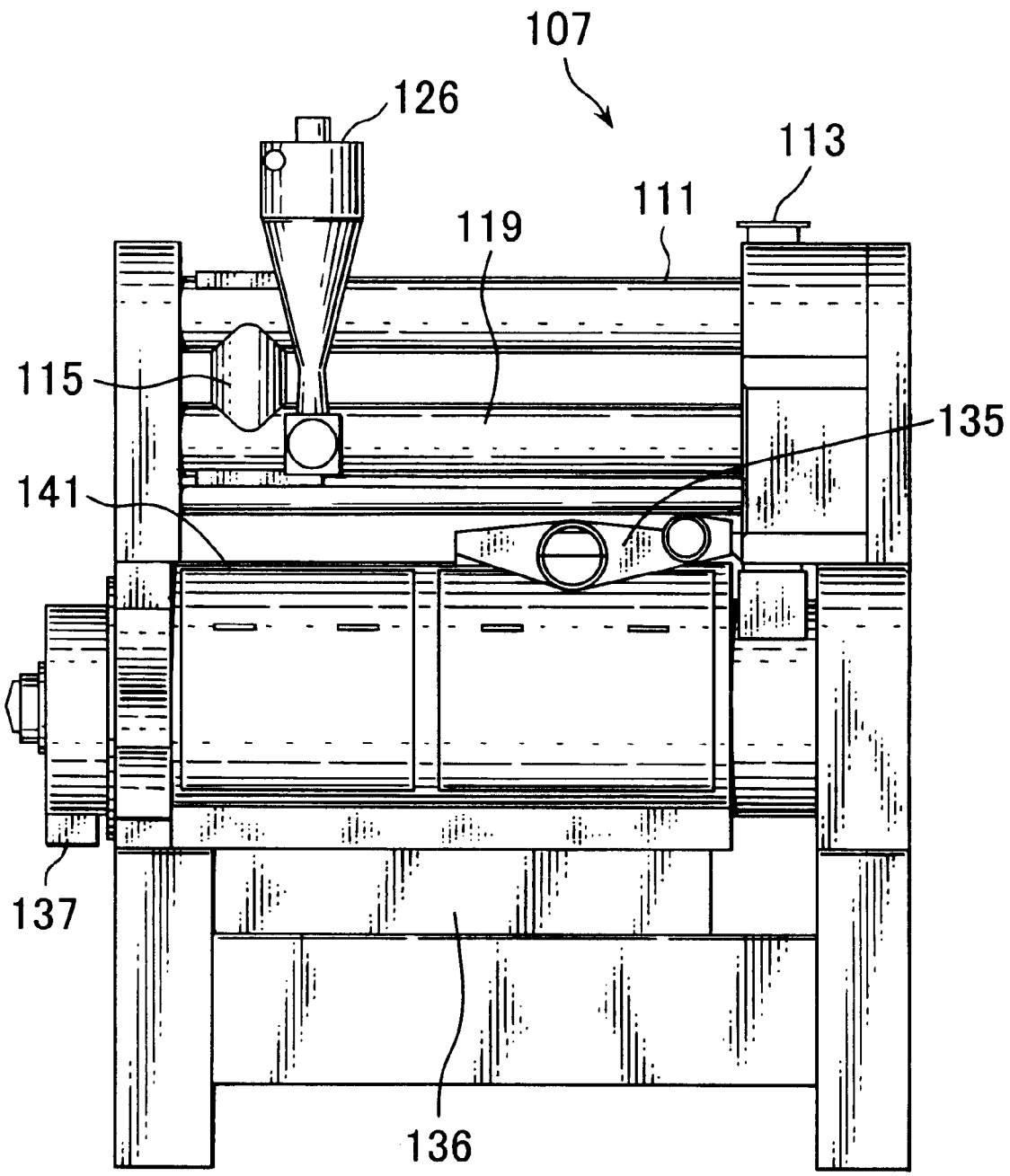
FIG. 14 is a front elevation of a no-bran rice manufacturing apparatus according to a ninth embodiment of the present invention.
Figure 15:
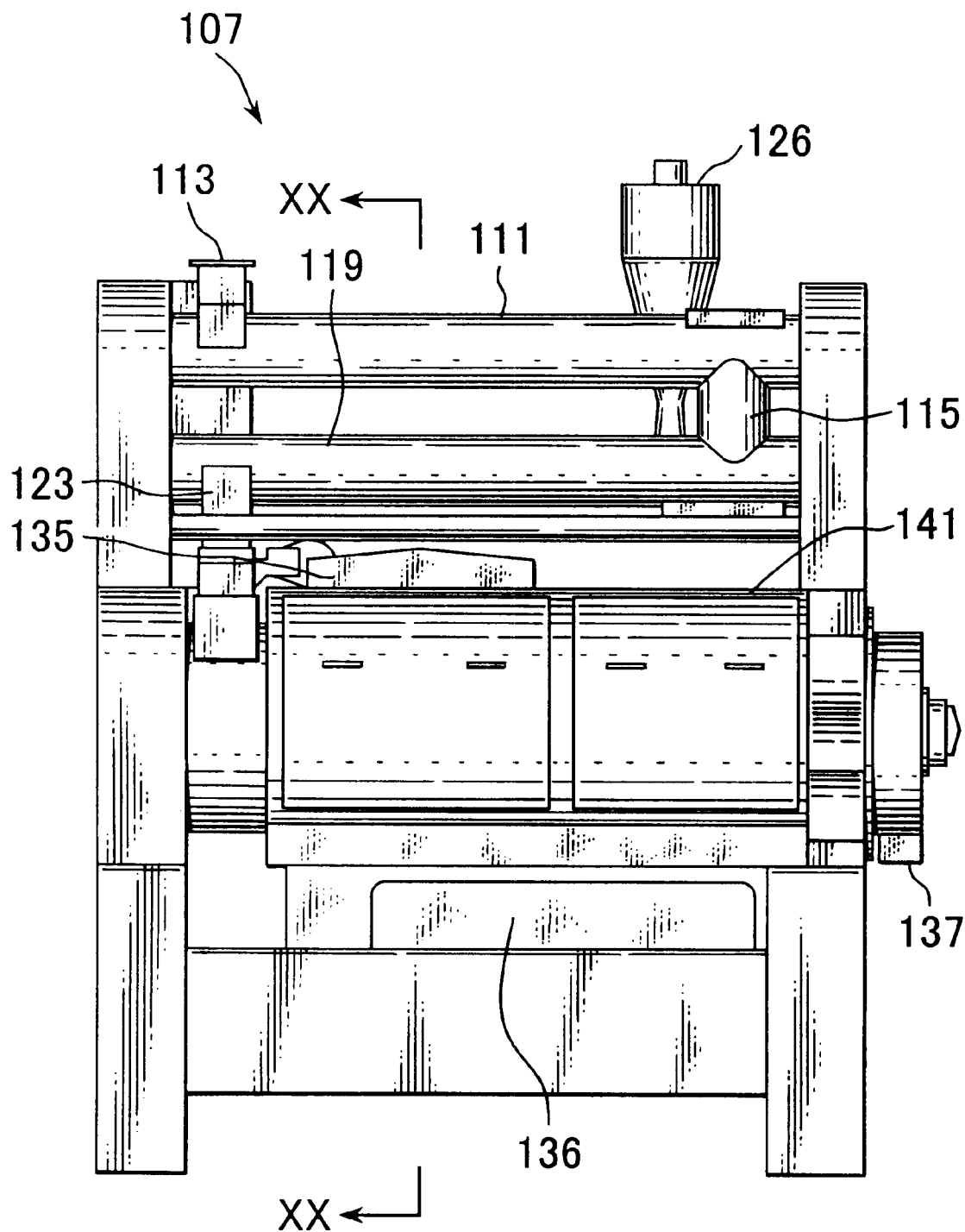
FIG. 15 is a rear elevation of the no-bran rice manufacturing apparatus as shown in FIG. 14.
Figure 18:
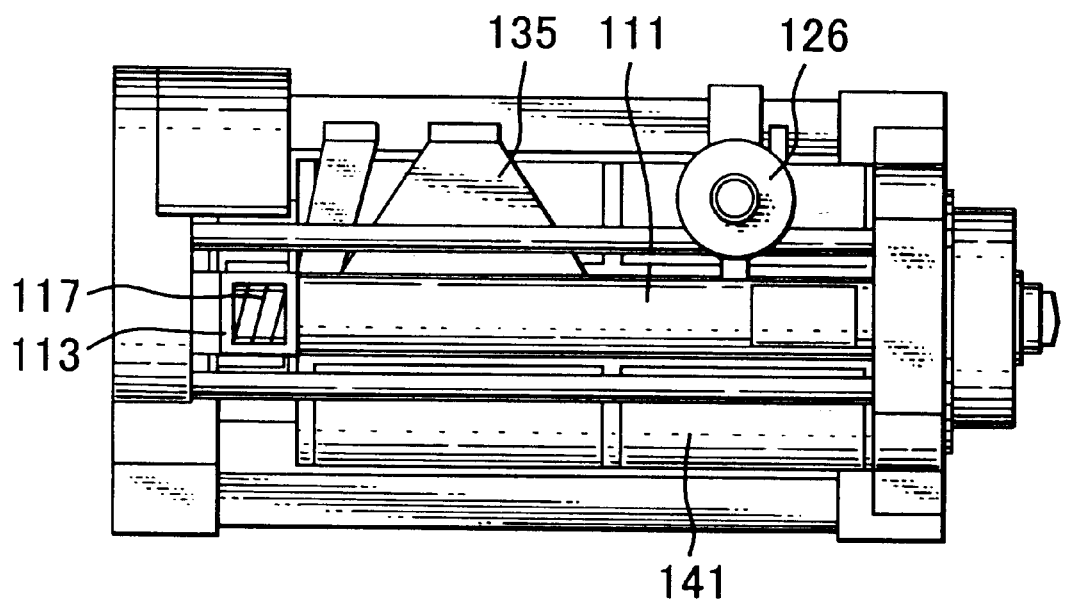
FIG. 18 is a top plan view of the no-bran rice manufacturing apparatus as shown in FIG. 14.
Figure 19:
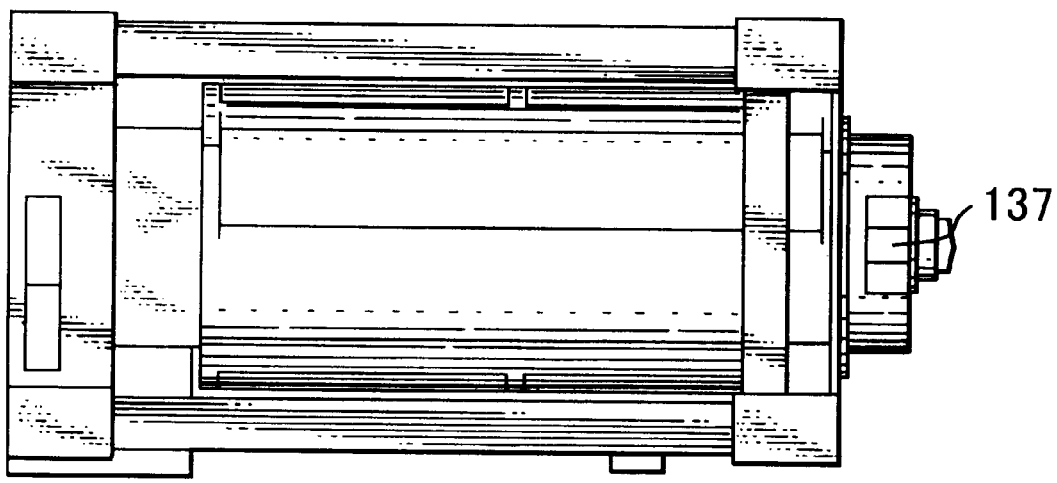
FIG. 19 is a bottom plan view of the no-bran rice manufacturing apparatus as shown in FIG. 14.
Figure 20:
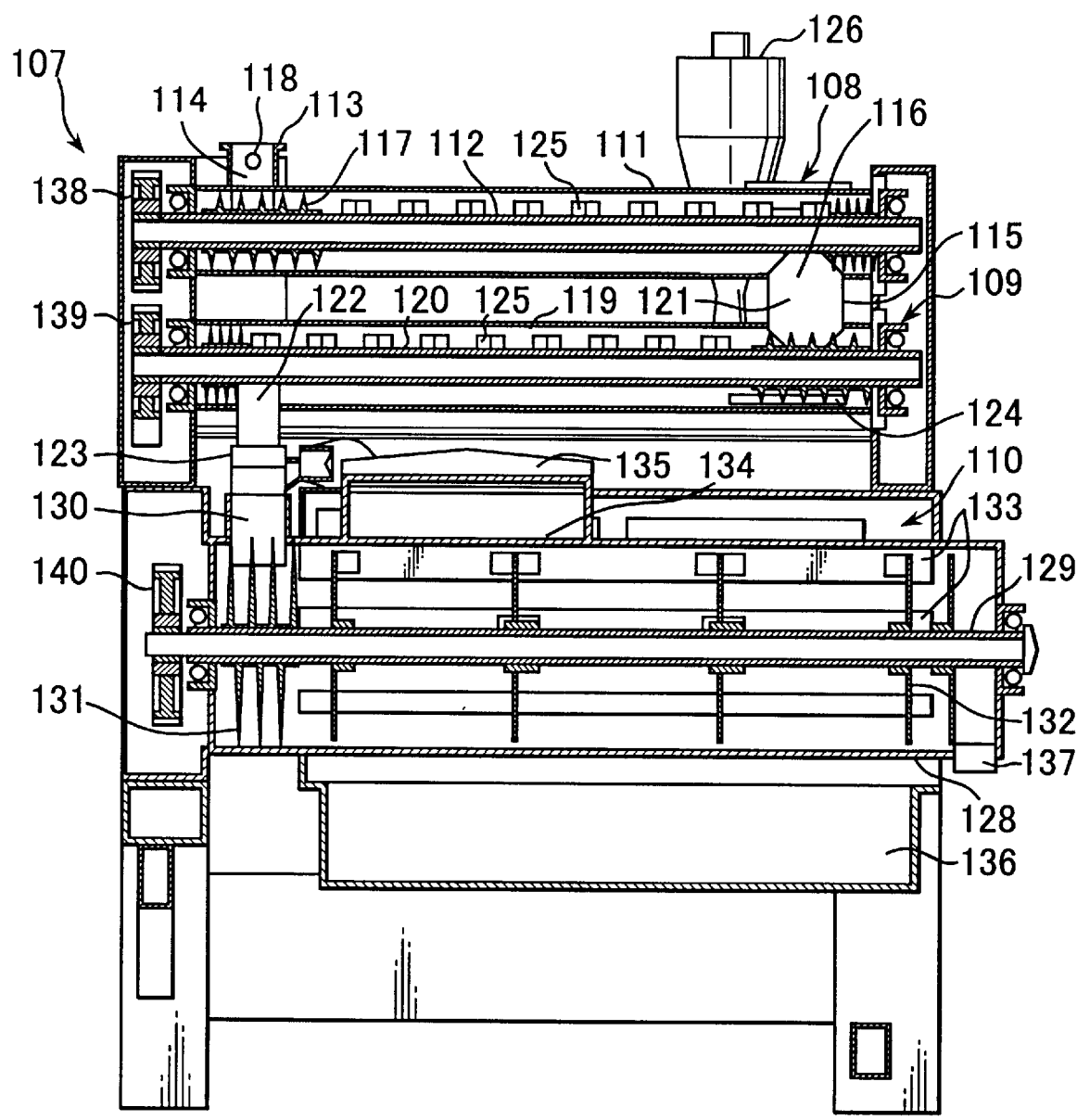
FIG. 20 is a vertical section along a line XX—XX in FIG. 15.
Figure 21:
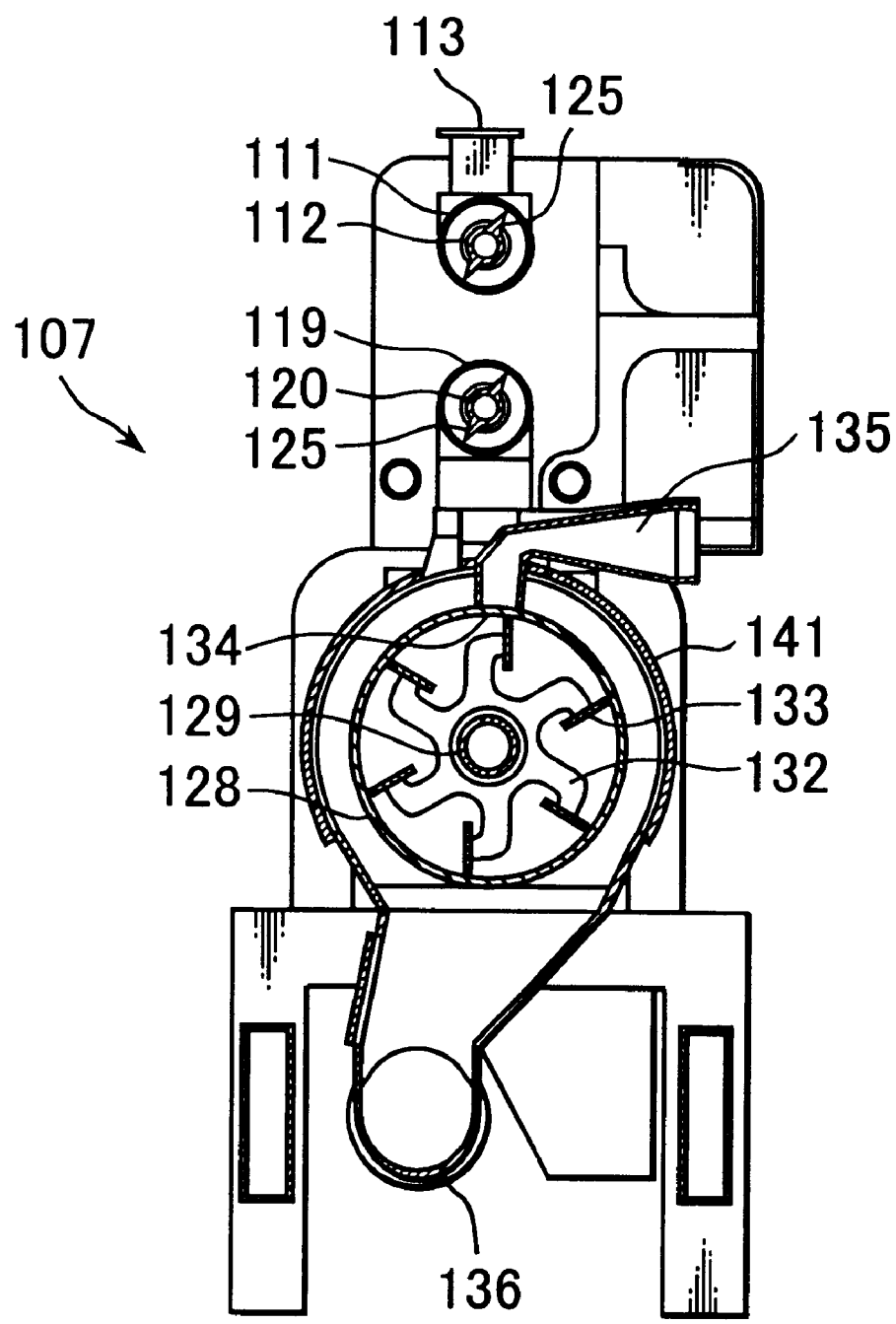
FIG. 21 is a vertical section along a line XXI—XXI in FIG. 17.

FIG. 13 shows an eighth embodiment of the present invention.

In this embodiment, the conventional polishing devices 5a–5c in the polishing process A in the fifth embodiment shown in FIG. 10 are replaced by a polisher using a plurality of rollers 6a–6c and 7a–7c.

In the polishing process, the plurality of rollers 6a–6c and 7a–7c are arranged in zigzag in the vertical direction to face successively, as disclosed in Japanese Utility-Model Publication No. 54-29262. With this arrangement, a polishing ability is increased and polished rice with bran sufficiently removed having polishing yield of approximately 92% is supplied to the next bran removing process B.

The polished rice polished by the polishing machine using rollers made of relatively hard elastic material is compared with the polished rice polished by a conventional polishing machine referring the following table 2.

TABLE 2

| Item | Polishing Device | |
|---|---|---|
| | polishing device according to this embodiment | conventional polishing device |
| yield | 92–91 | 90 |
| whiteness | not lower than 45 | 40 |
| turbidness | 60 | 120 |
| moisture | 14.0 | 14.0 |
| increasing ratio of grinded rice (%) | 0 | 0.5 |

FIGS. 14–21 show a no-bran rice manufacturing apparatus according to a ninth embodiment of the present invention.

A polished rice processing apparatus 107 comprises a wet processing device 108, a mixing/stirring device 109 and a separating/drying device 110 which are arranged substantially parallel to one another and horisontal. Material polished rice supplied into the wet processing device 108 is fed to the mixing/stirring device 109 and the separating/drying device 110 successively to remove bran stuck on a surface of the polished rice with tasty components remaining on a surface of the polished rice.

The wet processing device 108 which is arranged at the top of the polished rice processing apparatus 107 comprises a screw cylinder 111 and a screw shaft 112 rotatably supported in the screw cylinder 111. A supplying cylinder 113 is connected to an inlet 114 arranged at one end portion of the screw cylinder 111 and a outlet cylinder 115 is arranged vertically and connected to an outlet 116 arranged at the other end portion of the screw cylinder 111.

The screw shaft 112 has a screw blade 117 at a proximal portion of thereof and a plurality of stirring vanes 125 on the remaining portion. A spray nozzle 118 is arranged in the supply cylinder 113 to spray water to the material polished rice thrown into the supply cylinder 113. A pulley 138 fixed to one end of the screw shaft 112 is connected with a motor not shown through a belt.

The mixing/stirring processing device 109 is arranged under the wet processing device 108 and comprises a screw cylinder 119 having substantially the same dimensions and a screw shaft 120 rotatably supported in the screw cylinder 119. The outlet cylinder 115 is connected to an inlet 121 arranged at a proximal end portion of the screw cylinder 112 and an outlet cylinder 123 is arranged vertically and connected to an outlet 122 arranged at the other end portion of the screw cylinder 120. The screw shaft 120 has a screw blade 124 at a proximal portion of thereof and a plurality of stirring vanes 125 on the remaining portion.

The screw shaft 120 has a screw blade 124 at a proximal portion of thereof and a plurality of stirring vanes 125 on the remaining portion. A hopper 126 for supplying grains is arranged behind the screw cylinder 119 and connected to the screw cylinder 119 through a supplying conveyer 127 at a stirring start portion thereof. A pulley 139 fixed to one end of the screw shaft 120 is connected with a motor not shown through a belt.

The separating/drying device 110 is arranged below the mixing/stirring device 109 and comprises a screen cylinder 128 having a plurality of slits and a rotary shaft 129 supported rotatably in the screen cylinder 128. The outlet cylinder 123 of the mixing/stirring device 109 is connected to an inlet 130 arranged at a proximal end portion of the screen cylinder 128. The rotary shaft 129 has a screw blade 131 at a proximal portion of thereof and a plurality of longitudinal stirring vanes 133 supported by radially extending arms 132 on the remaining portion. A pulley 140 fixed to one end of the screw shaft 129 is connected with a motor (not shown) through a belt.

A blowing duct 135 is connected to a blowing inlet 134 arranged at a top of the screen cylinder 128. An outer casing cylinder 141 is arranged to cover the screen cylinder 128 and a blowing discharge duct 136 is connected to the outer casing cylinder 141 at a bottom portion thereof. A processed polished rice outlet 137 is provided at an distal end of the screen cylinder 128.

An operation of the polished rice processing apparatus 107 will be described.

Predetermined amount of material polished rice is supplied into the screw cylinder 111 from the supplying cylinder 113 which is connected to a supplying shoot (not shown). Moisture of approximately 5% by weight is added to the material polished rice by the mist sprayed from the spray nozzle 118 arranged near the inlet 114. The polished rice with moisture added is stirred by the stirring vanes 125 while being fed towards the distal end portion of the screw cylinder 111 by the screw blade 117 rotating at 500 rpm. Moisture supplied in the form of mist permeates over a surface of each grain of the polished rice to soften bran remaining on each grain of the polished rice.

Subsequently, the polished rice is fed into the screw cylinder 119 of the mixing/stirring device 109 from the inlet 121 through the outlet 116 and the discharge cylinder 115 of the wet processing device 108, and is stirred by the stirring vanes 125 while being fed towards the distal end portion of the screw cylinder 119 by the screw blade 124 rotating at 600 rpm. At the same time, grains for absorbing and removing bran in the hopper 126 is fed into the screw cylinder 119 by the screw conveyer 127. The granular material may be small grains such as pearl tapioca obtained by processing starch to be pre-gelatinized and dried to be form to a ball having a hardness of 2–5 $kgf/cm^2$ and a standard granularity. The granular material of high temperature of 70° C.–100° C. is supplied and mixed with the polished rice. A ratio of mixture of the granular material to the polished rice is 50% in weight.

The bran remaining on the surface of each grain of the polished rice has been softened by the moisture added in the wet processing device 8 is gelatinized immediately after touching with the granular material of high temperature and is caught by the granular material and removed from the surface of each grain of the polished rice. Since the bran is securely caught by the granular material, the bran does not adheres to the surface of the grains again. The moisture of the bran is evaporated to absorb heat from the surface of each grain to lower the temperature thereof. The pressure in the screw cylinder 119 is approximately 20 $gf/cm^2$.

In the subsequent final separating/drying process, the polished rice with the granular material is fed into the screen cylinder 128 of the separating/drying device 110 from the inlet 130 through the outlet cylinder 123 and is stirred by the stirring vanes 133 while being fed to the distal end portion of the screen cylinder 128 by the feeding screw blade 131 rotating at 280 r.p.m. to be separate from the granular material. At the same time, the surface of each grain of the polished rice is dried by the air of 40° C. supplied from the air supply opening 134 at blowing rate of 60 $m^3$ per minute to assist separation of the polished rice from the granular material.

The polished rice passed through the screen cylinder 128 is discharged outside from the processed polished rice outlet 137. The granular material dropped from the slits of the screen cylinder 128 is discharged from the blowing discharge duct 136 with the blowing air and is recycled after separated from the bran by a bag filter (not shown) and regulated the granularity thereof by a sifter (not shown).

The pearl tapioca to be used as the granular material in the bran removing process is manufactured according to the following processes.

1) Material cassava and a large amount of water at normal temperature are fed in a screw conveying device and stirred while conveying to wash and hull the cassava.
2) The washed and hulled cassava thrown into a drum-like device is stirred and grinded to fine grains.
3) The grinded cassava is supplied to a centrifugal separator having a mesh inside to separate and take out milky starch.
4) The milky starch is stationarily rested for two or three days in a tank to settle starch.
5) Liquid at upper portion of the tank is discharged to take out the solid starch containing water. The wet starch is placed on a horizontal dryer having a steel plate and stirred and dried manually to obtain powder tapioca.
6) To obtain pearl tapioca in the form of small ball, water is added to the powder tapioca to have clay-like state and the clay-like tapioca is rested for 10 to 12 hours. Then, the clay-like tapioca and the powder tapioca are supplied to a granulating device formed of cloth to have a form of hammock to swing and mixed with each other to be granulated.
7) The granular tapioca is fed into a drum-like dryer and heated with hot air of 70° C.–90° C.
8) The dried granular tapioca is sifted by a vibrator having a woven cloth at the upper side and a steel plate at the lower side. The granular tapioca sifted dropped through the woven cloth rolls on the steel plate to have spherical shape.
9) The spherical tapioca is dried to have moisture of 10%–15% on a horizontal dryer at 40° C.–50° C. while being stirred manually.
10) The dried spherical tapioca is graded into three grades of micro grade of 1 mm, small grade of 3 mm and large grade of 5 mm.
11) The obtained pearl tapioca in each grade is measured and bagged.

According to the present invention, the bran stuck on a surface of each grain of polished cereal is removed without imparting any damage on the surface. Further, taste of the polished cereal is improved by adding moisture to the polished cereal, so that the no-brain rice contains moisture of 15% in weight.

Furthermore, the bran remaining in minute grooves on a surface of polished rice is completely removed by providing a plurality of bran removing processes or providing a wet polishing device optionally to obtain bright no-bran rice of improved whiteness.

By mixing and stirring the heated granular material with the polished cereal, the bran stuck on each grain of the polished cereal is gelatinized by heat from the granular material when touched with granular material to immediately increase adhesiveness. An appetence between the gelatinized bran and the granular material gelatinized by heat as well is enhanced and thus a cross link is formed between the bran and the granular material, so that the granular material easily catches the bran and removes the bran form the surface of the grain.

What is claimed is:

1. A method of manufacturing no-bran cereal comprising the steps of:
   (a) adding moisture to polished cereal;
   (b) mixing and stirring granular material with the moistened polished cereal so as to remove bran stuck on a surface of each grain of the polished cereal; and
   (c) separating the polished cereal from the granular material.

2. A method of manufacturing no-bran cereal according to claim 1, wherein said cereal comprises rice.

3. A method of manufacturing no-bran cereal according to claim 1, wherein said cereal comprises wheat or barley corn.

4. A method of manufacturing no-bran cereal according to claim 1, wherein said granular material comprises an edible grinded cereal.

5. A method of manufacturing no-bran cereal according to claim 4, wherein said granular material comprises grinded rice.

6. A method of manufacturing no-bran cereal according to claim 5, wherein said granular material comprises pre-gelatinized grinded rice.

7. A method of manufacturing no-bran cereal according to claim 4, wherein said granular material is selected from the group consisting of grinded wheat, grinded barleycorn, grinded millet, grinded buckwheat, and grinded kaoliang.

8. A method of manufacturing no-bran cereal according to claim 1, wherein said granular material comprises pearl tapioca.

9. A method of manufacturing no-bran cereal according to claim 1, wherein said granular material has granularity of 1.0 mm–1.7 mm and moisture not higher than 5% in weight.

10. A method of manufacturing no-bran cereal according to claim 1, further comprising a step of heating said granular material before said step (b).

11. A method of manufacturing no-bran cereal according to claim 10, wherein said granular material is heated to a temperature not lower than 60° C.

12. A method of manufacturing no-bran cereal according to claim 11, wherein said granular material is heated to a temperature in the range between 60° C. and 80° C.

13. A method of manufacturing no-bran cereal according to claim 1, wherein the polished cereal is mixed with the granular material, a weight of the granular material being 50% of a weight of the polished cereal, and stirred at a pressure of approximately 20 gf/cm$^2$ in said step (b).

14. A method of manufacturing no-bran cereal according to claim 1, further comprising a step of processing hulled cereal by passing the hulled cereal through a pair of rollers coated by elastic material by a plurality of times to obtain the polished cereal before said step (a).

15. A method of manufacturing no-bran cereal according to claim 14, wherein the hulled cereal is processed to the polished cereal at polishing yield of approximately 92% in said step of processing hulled cereal and the polished cereal is polished at polishing yield of approximately 91% in said step (b).

16. A method of manufacturing no-bran cereal according to claim 14, wherein moisture is added to the hulled cereal in said step of processing hulled cereal.

17. A method of manufacturing no-bran cereal according to claim 1, wherein moisture of 3%–5% of the polished cereal in weight is added to the polished cereal in said step (a).

18. A method of manufacturing no-bran cereal according to claim 1, said step (a) including spraying the polished cereal with water and stirring the polished cereal.

19. A method of manufacturing no-bran cereal according to claim 18, wherein the polished cereal is sprayed with water of 5% of the polished cereal in weight.

20. A method of manufacturing no-bran cereal according to claim 1, wherein said steps (b) and (c) are repeatedly performed after performing said step (a).

21. A method of manufacturing no-bran cereal according to claim 1, further comprising a step of wet-polishing the polished cereal after said step (c).

22. A method of manufacturing no-bran cereal according to claim 1, wherein said step (a) is performed immediately after finishing a polishing process of hulled cereal.

* * * * *

UNITED STATES PATENT AND TRADEMARK OFFICE
CERTIFICATE OF CORRECTION

PATENT NO.   : 6,610,345 B2
DATED        : August 26, 2003
INVENTOR(S)  : Satoru Satake et al.

Page 1 of 1

It is certified that error appears in the above-identified patent and that said Letters Patent is hereby corrected as shown below:

<u>Title page,</u>
Item [54], please change "METHOD OF MANUFACTURING NO-BRAN CEREAL" to -- METHOD OF AND APPARATUS FOR MANUFACTURING NO-BRAN CEREAL --

Signed and Sealed this

Tenth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,610,345 B2
DATED : August 26, 2003
INVENTOR(S) : Satoru Satake et al.

It is certified that error appears in the above-identified patent and that said Letters Patent is hereby corrected as shown below:

<u>Title page,</u>
Item [54], Title, change "METHOD OF AND APPARATUS FOR MANUFACTURING NO-BRAN CEREAL" to -- METHOD OF MANUFACTURING NO-BRAN CEREAL --.

Signed and Sealed this

Thirtieth Day of May, 2006

JON W. DUDAS
*Director of the United States Patent and Trademark Office*